United States Patent [19]

Antonelli et al.

[11] Patent Number: 4,477,534

[45] Date of Patent: Oct. 16, 1984

[54] AIR-DRYING HIGH-SOLIDS COATING COMPOSITIONS CONTAINING VINYL OXAZOLINE ESTERS AS REACTIVE DILUENTS

[75] Inventors: Joseph A. Antonelli, Riverton, N.J.; Joseph E. McLaughlin, Philadelphia; Clifford H. Strolle, Springfield, both of Pa.

[73] Assignee: E. I. Du Pont de Nemours and Company, Wilmington, Del.

[21] Appl. No.: 435,032

[22] Filed: Oct. 18, 1982

[51] Int. Cl.$^3$ .................... C08L 25/04; C08L 33/08; C08L 33/10
[52] U.S. Cl. .................................. 428/461; 128/441; 524/530; 525/279; 525/281
[58] Field of Search ................ 525/279, 281; 428/441, 428/461; 524/530

[56] References Cited

U.S. PATENT DOCUMENTS

| | | | |
|---|---|---|---|
| 3,248,397 | 4/1966 | Purcell | 260/21 |
| 4,147,674 | 4/1979 | Vasta | 260/17 R |
| 4,242,243 | 12/1980 | Antonelli et al. | 260/23.19 |
| 4,280,938 | 7/1981 | Strazik et al. | 260/21 |
| 4,281,091 | 7/1981 | Strazik et al. | 525/518 |
| 4,293,461 | 10/1981 | Strazik et al. | 260/18.5 |
| 4,307,001 | 12/1981 | Strazik et al. | 260/21 |
| 4,334,075 | 6/1982 | Strolle | 548/239 |

Primary Examiner—Allan Lieberman

[57] ABSTRACT

Air-drying resins such as acrylate- or methacrylate-acid drying-oil resins and alkyds can be blended with up to 70% by weight of the combined weights of a vinyl oxazoline ester as a reactive diluent. In an organic solvent, the blend produces a suspension or solution which has a lower viscosity than a suspension or solution of resin alone but with the same percentage of solids. When applied to a substrate, the blend dries in air to a good protective and ornamental coating. The oxazoline ester can be combined with up to about twice its weight of certain melamine condensates.

17 Claims, No Drawings

AIR-DRYING HIGH-SOLIDS COATING COMPOSITIONS CONTAINING VINYL OXAZOLINE ESTERS AS REACTIVE DILUENTS

BACKGROUND OF THE INVENTION

1. Field of the Invention

This invention relates to high solids coating materials formed from air-drying resins blended with vinyl oxazoline esters as reactive diluents.

2. Prior Art

Purcell U.S. Pat. No. 3,248,397 discloses oxazoline-fatty acid drying-oil esters carrying terminal vinyl unsaturation useful as reactive diluents in this invention.

Vasta U.S. Pat. No. 4,147,674 discloses copolymers containing vinyl oxazoline esters used as binders in aqueous coating compositions.

Antonelli et al. U.S. Pat. No. 4,242,243 (Antonelli) discloses acrylic-fatty acid resins preferred as binders in this invention.

Strazik et al. U.S. Pat. Nos. 4,280,938; 4,281,091; 4,293,461; and 4,307,001 (Strazik) show melamine condensates and unsaturated oil-modified resins useful in aspects of this invention.

Strolle U.S. Pat. No. 4,334,075 discloses oxazoline-fatty acid drying-oil esters carrying non-terminal vinyl unsaturation useful in the invention.

The above-mentioned art is specifically incorporated by reference herein.

DESCRIPTION OF THE INVENTION

In accordance with the present invention, it has been found that vinyl oxazoline esters can be mixed or blended with air-drying resins used as binders in coating compositions to act as reactive diluents (compare Antonelli, Col. 5). The blends are formed as dispersions or solutions (molecular dispersions) in conventional organic solvents having lowered viscosity at the same or even high percentages of solids than if the resins were present alone. The higher percentage of solids results in lower solvent emissions upon evaporation. Air drying of the resin/ester blend on a substrate produces decorative and/or protective coatings similar to those produced by the resin alone.

The air-drying resins used in the invention are those conventionally employed, the air-drying resins of Antonelli U.S. Pat. No. 4,242,243 being preferred. These are polymers having a backbone of polymerized monomers selected from alkyl methacrylates, alkyl acrylates, styrene or mixtures thereof and polymerized hydroxyl-containing monomers of the hydroxyalkyl methacrylates, hydroxyalkyl acrylates, and mixtures thereof, the active hydrogen of at least one pendant hydroxyl group of the backbone being replaced by

where $R^2$ is the residue of a drying-oil fatty acid and, optionally, epoxy-containing monomers, e.g., esters.

One useful polymer comprises about 35–65% by weight of an alkyl methacrylate, preferably methyl methacrylate, 10–30% by weight of a hydroxyalkyl methacrylate or an hydroxyalkyl acrylate having 2–4 carbon atoms in the alkyl group, and 25–45% by weight of drying-oil fatty acids. A useful polymer of this type comprises methyl methacrylate, hydroxyethyl methacrylate and a mixture of oleic, linoleic and conjugated linoleic acids, e.g., soy oil fatty acids.

Another useful polymer comprises 40–55% by weight of methyl methacrylate, 15–15% by weight of hydroxyethyl methacrylate and 30–40% by weight of the aforementioned mixture of drying-oil fatty acids.

The polymers shown by Antonelli containing up to 10% by weight of an epoxy ester are also very useful. The preferred polymeric binder is, in fact, that of Antonelli's Example 1 or the acrylic Resin X, below, containing "Cadura".

While the acrylate and methacrylate polymers shown by Antonelli are preferred, other air-drying resins can be used as well. The Strazik patents give a number of such resins including the well-known alkyds, oil-modified epoxy resins and styrene/allyl alcohol copolymers, and the like.

The vinyl oxazoline esters here blended with air-drying resins as reactive diluents are in general of two types. The first is the well-known terminally unsaturated type shown, for example, by Purcell. A formula for these compounds may be written as:

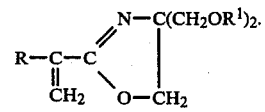

Some of these compounds are available commercially. In the second type of ester, the vinyl unsaturation is nonterminal. The compounds are prepared as disclosed by Strolle and may be represented by the formula

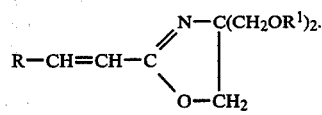

In both the formulae above, R and $R^1$ may vary widely as illustrated by the references named. For the purposes of this invention, however, at least the $R^1$'s should be residues of long-chain unsaturated fatty acids. Typical unsaturated fatty acid residues desirable are those of china wood oil fatty acids, linseed oil fatty (LOFA) acids, soya oil fatty acids (SOFA), tall oil fatty acids (TOFA), dehydrated castor oil fatty acid (DCOFA), safflower oil fatty acids, linoleic and linolenic acids, mixtures of any of the above, and the like. R may be a long-chain unsaturated fatty acid residue but may also be a shortchain or low-molecular-weight residue such as that of crotonic, cinnamic or the like acid (cf. Strolle). In this application, the substituents will be indicated in the order $R/R^1$, thus: crotonic acid/DCOFA means that the R substituent is a crotonic acid residue and the two $R^1$ substituents are dehydrated castor oil fatty acid residues. A preferred vinyl oxazoline ester is that illustrated by Strolle, crotonic acid/SOFA vinyl oxazoline ester.

The blends of this invention, useful coating compositions, are obtained by intimately mixing the ingredients, the conventional air-drying resins and the air-drying vinyl oxazoline esters, generally in an organic solvent. Nonreactive organic solvents such as hydrocarbons, ketones, and the like and mixtures thereof can be used.

The blends are soluble in the solvents to give solutions or dispersions containing a higher percentage of solids for a given viscosity than a solution containing the resin alone. The present reactive diluents are effective in very low amounts, the effect of 1% by weight based on weight of solids (resin plus diluent) being noticeable on the viscosity, for example. However, in general the blends (solids) contain about 10-70% by weight of vinyl oxazoline ester, 10-50% being preferred, and 90-30% of air-drying resin. In this manner, easily handled solutions or dispersions containing up to more than 70% of solids can readily be obtained.

While clear solutions may be used as coatings, the solutions are generally pigmented and may contain other additives, e.g., driers, as shown in detail in Antonelli, especially in Column 4. Typical pigments usable in the present compositions include metallic oxides such as titanium dioxide, iron oxide, zinc oxide, and the like, metallic flakes such as aluminum flake, bronze flake, nickel flake, metallic powders, metallic hydroxides, phthalocyanine pigments, Monastral ® (Du Pont) pigments, molybdate pigments such as molybdate orange pigments, quinacridone pigments, sulfate pigments, carbonate pigments, carbon black pigments, silica pigments and other organic and inorganic pigments commonly used in coatings.

Pigments when used are added in a pigment to binder (P/B) weight ratio of about 0.5/100 to 200/100 where the binder is the film-forming polymer constituent (resin plus diluent) of the coating composition.

The vinyl oxazoline esters discussed are good reactive diluents when used by themselves. They are also quite effective when employed in admixture with the unsaturated melamine condensates of the Strazik patents, particularly U.S. Pat. No. 4,280,938. The effect of the two reactive diluents appears synergistic in the range of up to 30% by weight of the total solids present. In such a case, the air-drying resin used may constitute 60-70% by weight of solids present, the vinyl oxazoline ester, about 10-30%, and the melamine condensate, the remaining 30-10%. A preferred melamine condensate is that of Example 1 of U.S. Pat. No. 4,280,938, the unsaturated melamine condensate containing 1.5 acrylamide units and 1.5 allyl units per melamine ring.

Coating compositions of the invention are easily prepared. The major ingredients such as the binder, the reactive diluent or diluents, and pigment, if any, are obtained commercially or prepared and mixed in an appropriate solvent. The viscosity is adjusted as desired and the composition is applied to a substrate. Any conventional substrate such as metal, e.g., iron or steel, wood, or the like, can be employed. Application may be by any of the conventional methods such as with a brush but spraying is generally preferred. Inert by themselves, when allowed to stand in air the compositions harden rapidly to a tack-free protective and, if desired, ornamental coating.

EXAMPLES

There follow some examples illustrating various embodiments of the invention. In the examples, temperatures were ambient, pressures atmospheric, parts, ratios and percentages calculated in terms of weight, and viscosities taken at ambient temperature unless otherwise noted.

In these examples, a single acrylic resin, Resin X, was employed as a binder. It was prepared in solution substantially according to the procedure of Example 1 of Antonelli U.S. Pat. No. 4,242,243 from:

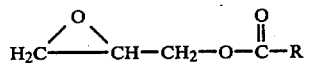

|  | Parts by Weight |
|---|---|
| Portion 1 | |
| Methyl methacrylate monomer | 63.56 |
| Hydroxyethyl methacrylate monomer | 21.187 |
| Methyl ethyl ketone | 67.798 |
| 2-Mercaptoethanol | 3.729 |
| Portion 2 | |
| Methyl methacrylate monomer | 173.731 |
| Hydroxyethyl methacrylate monomer | 80.510 |
| 2-Mercaptoethanol | 4.508 |
| Portion 3 | |
| Methyl ethyl ketone | 81.188 |
| 2,2'-Azobis(2,4-dimethyl valeronitrile) | 6.132 |
| Portion 4 | |
| Pamolyn ® 300 (linseed oil unsaturated fatty acid; about 20% oleic acid, 40% linoleic acid, and 40% conjugated linoleic acid. Pamolyn ® is a trademark of Hercules, Inc.) | 198.96 |
| Dibutyltin dilaurate | 0.550 |
| Portion 5 | |
| Xylene | 6.165 |
| Portion 6 | |
| "Cardura" E ester (a mixed ester of a synthetic tertiary carboxylic acid with the formula $$H_2C\overset{O}{\underset{\diagdown}{\diagup}}CH-CH_2-O-\overset{O}{\underset{\parallel}{C}}-R$$ where R is tertiary aliphatic hydrocarbon group having 8-10 carbon atoms) | 22.793 |
| Portion 7 | |
| Xylene | 244.912 |

The product, after the addition of Portion 6, had an AN of 2-4. This was thinned with Portion 7 to give 68% solids in xylene. The weight ratio methyl methacrylate/hydroxyethyl methacrylate/LOFA/"Cadura" was 42.32/18.13/35.48/4.06.

In the examples, four different vinyl oxazoline esters were also employed. One of these was a commercially procured ester preparable by the method of Purcell and the other three were prepared as shown by Strolle. These esters were:

Ester A. LOFA/LOFA vinyl oxazoline ester. This is the commercial product Chemacoil TA-101 brought from McWharton Chemicals Division of Commercial Solvents Corporation. It contains a low percentage of unreacted vinyl (see the discussion in Vasta, Col. 3) and R and the two $R^1$ groups are linseed oil fatty acid mixtures.

Ester B. Sorbic acid/DCOFA vinyl oxazoline ester. This compound is prepared by the method of Strolle, in the first step reacting sorbic acid (instead of crotonic acid) with tris(hydroxymethyl)aminomethane in xylene and in the second step reacting dehydrated castor oil fatty acid with the product of the first step.

Ester C. DCOFA/DCOFA vinyl oxazoline ester. This is formed by Strolle's process in a single step by reacting tris(hydroxymethyl)aminomethane with three equivalents of dehydrated castor oil fatty acid in xylene.

Ester D. Crotonic acid/SOFA vinyl oxazoline ester. This is the compound formed by Strolle's example in which tris(hydroxymethyl)aminomethane is reacted in a first step with crotonic acid and the product, in a second step, with soya oil fatty acids.

A composite millbase was used in the examples effectively made up from two simpler millbases to give the desired color:

|  | Millbase A (g) | Millbase B (g) |
|---|---|---|
| Acrylic Resin X | 35.73 | 16.01 |
| Hydrocarbon Solvent | 31.23 (aliphatic) | 23.23 (xylene) |
| Monastral ® Violet | 7.66 | — |
| Molybdate Orange | — | 80.85 |
| Inhibitor (methyl ethyl ketoxime) | — | 0.34 |
|  | 74.62 | 120.43 |

Millbase A was ground in a ball mill to a fineness of less than 0.5 mil. Millbase B was ground in a sand mill also to a fineness of less than 0.5 mil.

Example 1

Crotonic Acid/Soya Oil Fatty Acid Vinyl Oxazoline Ester Reactive Diluent

| Ingredient | Parts |
|---|---|
| Acrylic Resin X | 85.10 |
| Millbase A | 34.80 |
| Millbase B | 21.39 |
| Cobalt Drier | 0.83 |
| Xylene | 7.24 |
|  | 149.85 |

The above ingredients were thoroughly mixed with agitation.

To 150 g (149.9) of each of four mixtures as above was added 30 g of solids (Resin X and/or Ester D) to give total binder compositions with Resin/Ester ratios of 100/0 (1), 90/10 (2), 80/20 (3) and 70/30 (4). The solids content of each composition was adjusted to 65% by weight with xylene and further to a spray viscosity of about 120 cps. The solutions were sprayed onto phosphatized steel panels, allowed to dry in air, and tested by the trisodium phosphate (TSP) test for dulling and wrinkling and the Cleveland Humidity (CH) test for blisters (density and size; 96 hrs unless otherwise noted). Results are given in Table I:

TABLE I

|  | 1 | 2 | 3 | 4 |
|---|---|---|---|---|
| Resin X* | 100 | 90 | 80 | 70 |
| Ester D* | 0 | 10 | 20 | 30 |
| Vis. (65% solids*; cps) | 1750 | 925 | 500 | 300 |
| Solids* @ spray vis. | 50.0 | 59.8 | 61.7 | 63 |
| Tack-free time (hrs) | 1 | 1 | 1 | 1 |
| Appearance |  | All Good |  |  |
| TSP Dulling | Slight | None | None | None |
| Wrinkling | None | None | None | None |
| CH Density | Dense; | Dense; | Slight; | Slight; |
| Size | medium | medium | fine | fine |

*All in wt %.

Example 2

Linseed Oil Fatty Acid/Linseed Oil Fatty Acid Vinyl Oxazoline Ester Reactive Diluent Example 1 was substantially repeated except that commercial Ester A was substituted for the Ester D used in the first example. TSP, CH, and also salt spray (SS) tests were run. In the last-mentioned test, coatings on phosphatized steel are scribed and rust creepage from the scored line is measured (in millimeters) at the end of 504 hrs. Results are in Table II:

TABLE II

|  | 1** | 5 | 6 | 7 |
|---|---|---|---|---|
| Resin X* | 100 | 90 | 80 | 70 |
| Ester A* | 0 | 10 | 20 | 30 |
| Vis. (65%) | 1750 | 925 | 550 | 500 |
| Solids* @ spray vis. | 50.0 | 55.0 | 59.5 | 57.4 |
| Tack-free Time |  | All 1 hr |  |  |
| TSP (Dulling and Wrinkling) |  | All Good |  |  |
| CH (Density and Size) |  | All Good |  |  |
| SS(504 hrs; mm) | 5 | 4 | 4 | 4 |

*All in wt %.
**Same as 1 in Example 1.

Example 3

Various Oxazoline Ester Reactive Diluents

Mixtures in xylene (70% by weight of solids) of acrylic Resin X alone (8) and in 80/20 admixture with Esters B (9), C (10), and D (11), respectively, were prepared, sprayed on phosphatized steel panels, and allowed to dry in air. Results are given in Table III:

TABLE III

|  | 8 | 9 | 10 | 11 |
|---|---|---|---|---|
| Resin X* | 100 | 80 | 80 | 80 |
| Reactive Diluent* | 0 | 20 | 20 | 20 |
| Gardner-Holdt Vis. (70% solids*) | Z4 + ¼ | Z1 − ¼ | Y − ¼ | Y − ¼ |
| Tack-free time (hrs) | 1 | 2 | 2 | 2 |

*All in wt %.

Example 4

Oxazoline Esters Plus Melamine Condensate As Reactive Diluent

Tests were made on the joint action of vinyl oxazoline esters and the unsaturated melamine condensates of the cited Strazik patents. Esters A and C were chosen as representative of vinyl oxazoline esters and the condensate containing 1.5 acrylamide units and 1.5 allyl units per melamine ring of Example 1 of U.S. Pat. Nos. 4,280,938 and 4,281,091, the Melamine Condensate, as representative of the unsaturated condensates.

Samples were made up based on 150 g samples in solvent as in Example 1. 30 g of combined Resin X, Esters A and C and/or melamine condensate were added to the 150 g solutions as indicated in the following table. Phosphatized steel panels were sprayed and the resultant coatings allowed to dry in air.

The results are given in:

TABLE IV

|  | 12 | 13 | 14 | 15 | 16 | 17 |
|---|---|---|---|---|---|---|
| Resin X* | 80 | 80 | 70 | 70 | 70 | 100 |
| Melamine Condensate* | 20 | 10 | 10 | 20 | 10 | — |
| Ester A* | — | 10 | 20 | — | — | — |
| Ester C* | — | — | — | 10 | 20 | — |

TABLE IV-continued

| | 12 | 13 | 14 | 15 | 16 | 17 |
|---|---|---|---|---|---|---|
| Viscosity (65%* solids; cps) | 1150 | 575 | 500 | 575 | 400 | 2500 |
| 62% solids* | 550 | 300 | 250 | 275 | 225 | 1000 |
| 60% solids* | 300 | 200 | 175 | 200 | 150 | 600 |
| Tack-free Time (hrs) | 21 | 21 | 21 | 21 | 2–3 | 21 |
| TSP Dulling | Slight | Slight | None | Slight | None | Slight |
| Wrinkling | None | None | None | None | None | None |
| CH Density (96 hrs) Size | 80% #6 | 80% #6 | 40% #8 | 80% #6 | 20% #8 | 10% #8 |
| Density (504 hrs) Size | 80% #6–8 | 90% #8 | 20% #6–8 | 20% #6–8 | 10% #8 | 5% #6–8 |
| SS (504 hrs; mm) | 4 | 4 | 6 | 5 | 5 | 6 |
| % 60° Gloss Retained QUV accelerated weathering (586 hrs) | 26 | 20 | 23 | 25 | 18 | 12 |

*All in wt %.

We claim:

1. A high solids coating composition comprising a dispersion, in a nonreactive organic solvent,
    about 90–30% by weight of an air-drying resin having a backbone of polymerized monomers selected from the group consisting of alkyl methacrylates, alkyl acrylates, styrene or mixtures thereof and polymerized hydroxyl-containing monomers selected from the group consisting of hydroxyalkyl methacrylates, hydroxyalkylacrylates and mixtures thereof wherein the active hydrogen of at least one pendant hydroxyl group of the backbone is replaced by

R² being the residue of a drying-oil fatty acid, and about 10–70% by weight of an air-drying vinyl oxazoline ester as a reactive diluent, the ester being selected from at least one member of the group consisting of

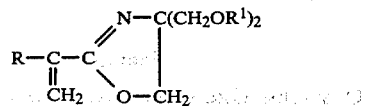

and

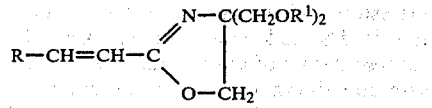

wherein wherein the R's are residues of ethylenically unsaturated acids and the R¹'s are residues of long-chain drying-oil fatty acids.

2. A coating composition of claim 1 wherein the air-drying resin comprises about 35–65% by weight of alkyl methacrylate, 10–30% by weight of hydroxyalkyl methacrylate or hydroxyalkyl acrylate each having 2–4 carbon atoms in the alkyl group, and 25–45% by weight of drying oil fatty acid.

3. A coating composition of claim 1 wherein the air-drying resin comprises additionally up to about 10% by weight of an epoxy-containing monomer.

4. A coating composition of claim 3 wherein the air-drying resin comprises methyl methacrylate/hydroxyethyl methacrylate/linseed oil fatty acid residue the ester

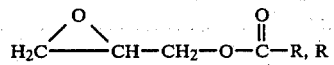

being an aliphatic hydrocarbon group having 8–10 carbon atoms having a weight ratio of about 42.32/18.13/35.48/4.06.

5. A coating composition of claim 1 wherein the vinyl oxazoline ester is selected from at least one member of the group consisting of linseed oil fatty acid/linseed oil fatty acid vinyl oxazoline ester, sorbic acid/dehydrated castor oil fatty acid vinyl oxazoline ester, dehydrated castor oil fatty acid/dehydrated castor oil fatty acid vinyl oxazoline ester and crotonic acid/soya oil fatty acid vinyl oxazoline ester.

6. A coating composition of claim 1 wherein the vinyl oxazoline ester is mixed with up to twice its weight of an unsaturated condensate of an alkoxymethylmelamine, an allylic alcohol and an acrylamide.

7. A coating composition of claim 6 wherein the unsaturated condensate contains 1.5 acrylamide units and 1.5 allyl units per malamine ring.

8. A pigmented coating composition of claim 1.

9. The process which comprises applying a coating composition of claim 1 to a substrate and drying the same in air.

10. The process of claim 9 wherein the coating composition is applied by spraying.

11. A substrate carrying a cured film of a coating composition of claim 1.

12. A metallic substrate carrying a cured film of a coating composition of claim 1.

13. A coating composition of claim 1 wherein:
    the air-drying resin is formed from methyl methacrylate/hydroxyethyl methacrylate/linseed oil fatty acid residue/"Cardura" E ester

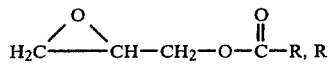

being an aliphatic hydrocarbon group, and
the air-drying vinyl oxazoline ester is selected from at least one member of the group consisting of linseed oil fatty acid/linseed oil fatty acid vinyl oxazoline ester, sorbic acid/dehydrated castor oil fatty acid vinyl oxazoline ester, dehydrated castor oil fatty acid/dehydrated castor oil fatty acid vinyl oxazoline ester and crotonic acid/soya oil fatty acid vinyl oxazoline ester.

14. A coating composition of claim 1 wherein:
the air-drying resin is formed from methyl methacrylate/hydroxyethyl methacrylate/linseed oil fatty acid residue the ester

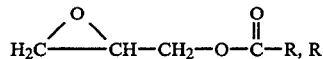

being an aliphatic hydrocarbon group, having 8–10 carbon atoms, in a weight ratio of about 42.32/18.13/35.48/4.06, and
the air-drying vinyl oxazoline ester is linseed oil fatty acid/linseed oil fatty acid vinyl oxazoline ester.

15. A coating composition of claim 1 wherein:
the air-drying resin is formed from methyl methacrylate/hydroxyethyl methacrylate/linseed oil fatty acid residue the ester

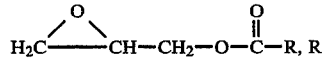

being an aliphatic hydrocarbon group having 8–10 carbon atoms, in a weight ratio of about 42.32/18.13/35.48/4.06, and
the air-drying vinyl oxazoline ester is sorbic acid/dehydrated castor oil fatty acid vinyl oxazoline ester.

16. A coating composition of 1 wherein:
the air-drying resin is formed from methyl methacrylate/hydroxyethyl methacrylate/linseed oil fatty acid residue the ester

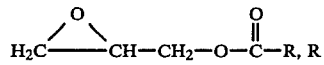

being an aliphatic hydrocarbon group having 8–10 carbon atoms, in a weight ratio of about 42.32/18.13/35.48/4.06, and
the air-drying vinyl oxazoline ester is dehydrated castor oil fatty acid/dehydrated castor oil fatty acid vinyl oxazoline ester.

17. A coating composition of claim 1 wherein:
the air-drying resin is form from methyl methacrylate/hydroxyethyl methacrylate/linseed oil fatty acid residue the ester

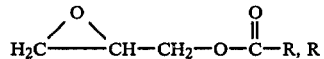

being an aliphatic hydrocarbon group having 8–10 carbon atoms, in a weight ratio of about 42.32/18.13/35.48/4.06, and
the air-drying vinyl oxazoline ester is crotonic acid/soya oil fatty acid vinyl oxazoline ester.

* * * * *